(12) United States Patent
Hc et al.

(10) Patent No.: US 10,486,481 B2
(45) Date of Patent: Nov. 26, 2019

(54) BUSH PIN, A BRACKET AND A MOUNTING ASSEMBLY FOR A V-STAY FOR A VEHICLE

(71) Applicant: VOLVO TRUCK CORPORATION, Göteborg (SE)

(72) Inventors: Ravindra Hc, Bangalore (IN); Durga Prasad Chervu, Bangalore (IN); Roland Svensson, Bua (SE); Yogesh Ramachandra, Bangalore (IN); Yashaswi Kashyap, Bangalore (IN)

(73) Assignee: VOLVO TRUCK CORPORATION, Göteborg (SE)

( * ) Notice: Subject to any disclaimer, the term of this patent is extended or adjusted under 35 U.S.C. 154(b) by 5 days.

(21) Appl. No.: 15/547,484

(22) PCT Filed: Jan. 13, 2016

(86) PCT No.: PCT/EP2016/050510
§ 371 (c)(1),
(2) Date: Jul. 29, 2017

(87) PCT Pub. No.: WO2016/120063
PCT Pub. Date: Aug. 4, 2016

(65) Prior Publication Data
US 2018/0001724 A1  Jan. 4, 2018

(30) Foreign Application Priority Data
Jan. 30, 2015  (IN) .............. 455/CHE2015

(51) Int. Cl.
*B60G 7/00* (2006.01)
*F16C 11/04* (2006.01)
*F16C 11/06* (2006.01)

(52) U.S. Cl.
CPC ............. *B60G 7/005* (2013.01); *B60G 7/008* (2013.01); *F16C 11/045* (2013.01);
(Continued)

(58) Field of Classification Search
CPC ....... B60G 7/005; B60G 7/008; F16C 11/045; F16C 11/0695
See application file for complete search history.

(56) References Cited

U.S. PATENT DOCUMENTS 5,458,359 A * 10/1995 Brandt ...................... B60G 9/00
                                                                     180/349
5,649,719 A *  7/1997 Wallace .................... B60G 7/02
                                                                     180/352
(Continued)

FOREIGN PATENT DOCUMENTS

CN          102152717 A     8/2011
DE     102009026739 A1    12/2010
(Continued)

OTHER PUBLICATIONS

International Search Report (dated Mar. 31, 2016) for corresponding International App. PCT/EP2016/050510.

*Primary Examiner* — Faye M Fleming
(74) *Attorney, Agent, or Firm* — Withrow & Terranova, PLLC

(57) ABSTRACT

A bush pin is provided for a V-stay presenting two arms adapted to structurally connect an axle casing for a vehicle wheel axle to a respective of a left and right vehicle frame member, including a central bush portion and a fastening portion on each side of the central bush portion, wherein each of the fastening portions is adapted to be connected to a bracket by a fastening arrangement, wherein the bush pin includes a first contact surface on each side of the central bush portion, and displaced from the fastening portions, for contacting a corresponding contact surface of the bracket in order to transfer loads.

28 Claims, 9 Drawing Sheets

(52) U.S. Cl.
CPC ...... *F16C 11/0614* (2013.01); *F16C 11/0695* (2013.01); *B60G 2200/315* (2013.01); *B60G 2204/148* (2013.01); *B60G 2204/416* (2013.01); *B60G 2204/43* (2013.01); *B60G 2204/44* (2013.01); *B60G 2206/124* (2013.01); *F16C 2240/30* (2013.01); *F16C 2326/05* (2013.01)

(56) References Cited

U.S. PATENT DOCUMENTS

| | | | | |
|---|---|---|---|---|
| 6,231,264 | B1 * | 5/2001 | McLaughlin | F16C 11/0614 180/352 |
| 6,863,289 | B2 * | 3/2005 | Buhl | B60G 7/005 280/124.111 |
| 7,306,211 | B2 * | 12/2007 | Bjorkgard | B60G 7/005 267/141 |
| 9,511,642 | B2 * | 12/2016 | Scheper | B60G 7/008 |
| 2001/0009321 | A1 * | 7/2001 | Toyoshima | B60G 7/005 280/86.75 |
| 2003/0089546 | A1 * | 5/2003 | Bjorkgard | B60G 7/008 180/378 |
| 2004/0012167 | A1 * | 1/2004 | Buhl | B60G 7/005 280/124.1 |
| 2008/0309040 | A1 | 12/2008 | Sprock et al. | |
| 2009/0001680 | A1 * | 1/2009 | Buhl | B60G 7/001 280/124.134 |
| 2009/0134593 | A1 * | 5/2009 | Angerfors | B60G 7/005 280/124.133 |
| 2014/0265073 | A1 | 9/2014 | Johnston | |

FOREIGN PATENT DOCUMENTS

| | | | |
|---|---|---|---|
| EP | 0487458 A1 | 5/1992 | |
| EP | 1120299 A1 | 8/2001 | |
| GB | 442621 A | 2/1936 | |
| JP | 10324125 A * | 12/1998 | ............ B60G 7/001 |
| JP | 2011133033 A | 7/2011 | |
| WO | 2014005787 A1 | 1/2014 | |

* cited by examiner

BUSH PIN, A BRACKET AND A MOUNTING ASSEMBLY FOR A V-STAY FOR A VEHICLE

BACKGROUND AND SUMMARY

The invention relates to a bush pin, a bracket and a mounting assembly for a V-stay presenting two arms adapted to structurally connect an axle casing for a vehicle wheel axle to a respective of a left and right vehicle frame member. The invention also relates to a vehicle comprising such a bush pin, bracket or mounting assembly.

In a large-sized vehicle, such as a truck or a bus, the rear axle or each rear axle is often connected to the vehicle frame with a V-rod structure. The rods in a V-rod structure extend from a respective of the left and right vehicle frame portions, to an axle casing where they meet, thereby forming a "V" as seen from above. The structure transfers loads mainly in the longitudinal (forward and rearward) direction, and in the sideways direction of the vehicle.

The V-rod structure comprises an assembly for joining the rods to the axle casing. This assembly can in some cases include a ball joint, and in other cases a rubber bushing.

Examples of the rubber bushing version are described in US20010009321A1. The axis of the rubber bushing is oriented in parallel with the sideways direction of the vehicle, and the rod ends are fixed to a bushing cover which envelopes the bushing. A fastening bar extends through the bushing and in said sideways direction. The fastening bar is fixed to the bushing, and at ends protruding on either side of the bushing it presents ears with mounting holes for bolts to secure the ears to respective bosses of a mounting bracket fixed to the axle casing.

The bolts are fastened with a pre-stress so as to provide a frictional force between the ears and the bosses for load transfer. However, such bolt pre-stress, combined with bolt shear stresses, gives as a result that the bolts may be damaged or break, which in turn might cause the V-stay structure and the axle to separate. To eliminate this risk, the mounting structure must be frequently maintained.

WO2014005787A1 presents a solution where bolts connecting the ears and the bosses extend through contact surfaces between the ears and the bosses, which contact surfaces are angled with respect to planes to which the bolts form normals. It is also suggested to provide contact surfaces with grooves to increase friction.

US2009134593A1 describes a design where the ears and bosses have complementary conical shapes around the bolt mounting holes.

However, even in view of known attempts to solve said problem, there is still room for improvement in providing a V-stay connection with a decreased risk of damage of failure due to loads transferred in it.

It is desirable to provide a mounting assembly for a vehicle wheel axle V-stay presenting a reduced risk of damage or fracture.

According to an aspect of the invention, a bush pin is provided for a V-stay presenting two arms adapted to structurally connect an axle casing for a vehicle wheel axle to a respective of a left and right vehicle frame member, comprising a central bush portion and a fastening portion, e.g. provided as an ear, on each side of the central bush portion, wherein each of the fastening portions is adapted to be connected to a bracket by a fastening arrangement, wherein the bush pin comprises a first contact surface on each side of the central bush portion, and displaced from the fastening portions, for contacting a corresponding contact surface of the bracket in order to transfer loads.

Preferably, as is known per se, the arms extend, in the mounted condition of the V-stay, partially longitudinally and partially laterally in the vehicle.

The displacement of the first contact surfaces from the fastening portions, and thereby the displacement of the first contact surface from the fastening arrangements, reduces the loads in the fastening arrangements. In the known solutions, since the fastening bolts extend through the friction surfaces, the effective area for providing friction for load transfer is reduced. The displacement according to the invention of the first contact surfaces from the fastening arrangements makes it possible to provide friction surfaces, the size of which are not limited by bolts of the fastening arrangement.

The invention provides for the first contact surfaces of the bush pin to be located entirely separated from the fastening arrangement. This means that at least a portion of the loads in the V-stay are transferred through the first contact surfaces, which are displaced from the fastening arrangements. Thus, the fastening arrangement can be provided merely to hold the bush pin to the bracket. This makes it possible to provide a V-stay presenting an improved control of the load transfer between the wheel axle and the frame of a vehicle.

With the improved load transfer control, the risk of damage in the fastening arrangements is significantly reduced. For example, e.g. where each fastening arrangement comprises a bolt, the bolts can be fastened with a lower pre-stress, since the frictional force at the bolt, needed in known solutions for load transfer, can be reduced since the first contacts surfaces serves the purpose of transferring loads. Also, the load transfer through the first contact surfaces, which are displaced from the bolts, reduces the bolt shear stresses. Due to the reduced pre-stress and shear stresses in the bolts, the risk of bolt damage or failure is significantly reduced.

The reduced risk of damage or failure means that the need for frequent maintenance of a mounting structure of the V-stay, in which the bush pin forms a part, is reduced.

Preferably, each of the first bush pin contact surfaces presents a normal which is non-perpendicular to an axial direction of the bush pin. Each first contact surface of the bush pin may be located axially inwards of the respective fastening portion, and may at least partly face axially outwards. Each of the first contact surfaces of the bush pin may be inclined so that the first contact surfaces form a wedge when inserted between the corresponding contact surfaces of the bracket. Where each of the fastening portions presents a through hole for receipt of a respective fastener of the fastening arrangement for clamping the fastening portion to the bracket, and a normal of the first contact surface may present an angle to an extension direction of the respective through hole of 15-90 degrees, preferably 60-90 degrees, preferably 70-89 degrees, preferably 80-88 degrees, preferably 83-87 degrees, for example 85 degrees. The fastener may be provided, as is known per se, as an elongated threaded fastener, e.g. as a bolt or a threaded pin. Where each of the fastening portions presents a second contact surface for being clamped to the bracket by the fastening arrangement, each of the first contact surfaces may extend in a plane which presents an angle to the respective second contact surface of 15-90 degrees, preferably 60-90 degrees, preferably 70-89 degrees, preferably 80-88 degrees, preferably 83-87 degrees, for example 85 degrees. Preferably, the through hole extends through the second contact surface.

Thus, the first contact surfaces of the bush pin may be located and oriented such that it is possible to mount the bush pin so as to be firmly wedged between the first contact surfaces of the bracket. This may ensure that a major portion of loads are transferred via the first contact surfaces. Also, where the bush pin is oriented in parallel with a wheel axis of the vehicle, said preferred orientations of the first contact surfaces provide a favourable balance of the load carrying capacities in the longitudinal and the lateral directions of the bush pin. More specifically, while forces caused by acceleration and braking of the vehicle are directed laterally to the bush pin, forces caused by vehicle cornering, which are typically larger, are directed in the longitudinal direction of the bush pin. In the mounted condition of the V-stay, each fastener of the respective fastening arrangement may extend in a plane, a normal of which is directed in a lateral and horizontal direction of the vehicle. The large angle between the normal of each first contact surface and the extension direction of the respective through hole, or each first contact surface and the respective second contact surface, provides for loads in the longitudinal direction of the bush pin to be transferred largely by compression via one of the first contact surfaces, which provides for a large load carrying capacity in a lateral direction of the vehicle, e.g. at vehicle cornering.

Preferably, each first contact surface of the bush pin forms a transition of bush pin thickness in a first transverse direction of the bush pin between the central bush portion and the respective fastening portion. Each of the fastening portions may be formed by a plate-shaped part.

Preferably, each of the first contact surfaces of the bush pin has a rounded shape. The first contact surfaces of the bracket can thereby have a complementary rounded shape. The first contact surfaces can present the shape of a part of a sphere or a part of a cone, or any other concave or convex shape. Each convex or concave first contact surface may present end regions which are distributed laterally to the bush pin axis, and the end regions may be offset, in relation to an intermediate region of the first contact surface, in the direction of the bush pin axis.

Such an arrangement of complementary convex and concave contact surfaces can provide a guiding function when assembling the bush pin to the bracket. For example, where the bush pin first contact surfaces are convex, they can form together a wedge to as to facilitate the assembly. During assembly, the bush pin and the bracket can be moved towards each other in a direction presented by elongated fasteners of the fasting arrangements in the assembled condition of the pin and bracket combination. It should be noted that the convex or concave bush pin contact surfaces can be provided regardless of the orientation of the fasteners. Such fasteners may for example be lateral to the pin axis, and vertical or horizontal in the mounted condition of the V-stay. The concavity may in itself have a load transferring effect, for example where the fasteners are vertical in the mounted condition of the V-stay. I.e., if each first contact surface has end regions which are distributed in the longitudinal direction of the vehicle, and which are offset, in relation to an intermediate region of the surface, in the sideways direction of the vehicle, first contact surface normal components which are parallel to the vehicle longitudinal direction will transfer loads between the vehicle frame and the axle casing at vehicle braking and acceleration.

According to another aspect of the invention, a bracket is provided for a V-stay presenting two arms adapted to structurally connect an axle casing for a vehicle wheel axle to a respective of a left and right vehicle frame member, comprising two load transfer members distributed along a distribution axis and connected by a base portion, each load transferring member presenting a fastening formation adapted to cooperate with a fastening arrangement for connecting the load transferring member to a bush pin, wherein each load transfer member presents a first contact surface which is displaced from the respective fastening formation, for contacting a corresponding contact surface of the bush pin in order to transfer loads.

Preferably, where the load transfer member fastening formation is a hole, the first contact surface of the load transfer member does not surround the hole, and is preferably not adjacent to the hole. Preferably there is a distance between the load transfer member fastening formation and the first contact surface of the load transfer member.

Similarly to what has been explained above, this provides for the first contact surface of the load transfer member to be located entirely separated from the fastening formation, and the fastening arrangement with which the fastening formation is adapted to cooperate for connecting the load transferring member to the bush pin. This means that at least a portion of the loads in the V-stay are transferred through the first contact surfaces, which are displaced from the fastening arrangements. Thus, the fastening arrangement can be provided merely to hold the bracket to the bush pin. This makes it possible to provide a V-stay presenting an improved control of the load transfer between the wheel axle and the frame of a vehicle.

Preferably, each of the first bracket contact surfaces presents a normal which is non-perpendicular to the axial direction. Preferably, each first contact surface of the bracket is located axially inwards of the respective hole, and at least partly faces axially inwards. Where the fastening formations are holes, a normal of each first contact surface may present an angle to an extension direction of the respective hole of 15-90 degrees, preferably 60-90 degrees, preferably 70-89 degrees, preferably 80-88 degrees, preferably 83-87 degrees, for example 85 degrees. Thereby each of the first contact surfaces of the bracket can be inclined so that the first contact surfaces delimit a tapered reception space to receive the bush pin. As explained above, each of the first contact surfaces of the bush pin can be inclined so that the first contact surfaces form a wedge when inserted between the corresponding contact surfaces of the bracket. Thereby, it is possible to mount the bush pin so as to be firmly wedged between the bracket contact surfaces. As exemplified below, elongated fasteners of the fasting arrangements may be directed in parallel with a direction of wedge dependent decrease of the distance between the first contact surfaces of the bush pin. Each load transfer member may present a second contact surface for being clamped to the bush pin by the fastening arrangement, and each of the first contact surfaces may extend in a plane which presents an angle to the respective second contact surface of 15-90 degrees, preferably 60-90 degrees, preferably 70-89 degrees, preferably 80-88 degrees, preferably 83-87 degrees, for example 85 degrees. Where the fastening formations are holes, and each hole may extend through the respective second contact surface.

Similarly to what has been explained above, preferred orientations of the first contact surfaces may ensure that a major portion of loads are transferred via the first contact surfaces, and provide a favourable balance of the load carrying capacities transversely to and in parallel with the distribution axis.

Preferably, each of the first contact surfaces of the bracket has a rounded shape. The first contact surfaces of the bush pin can thereby have a complementary rounded shape. As explained above, such an arrangement of complementary convex and concave contact surfaces can provide a guiding function when assembling the bush pin to the bracket, and may have a load transferring effect.

According to another aspect of the invention, a mounting assembly is provided for a V-stay presenting two arms adapted to structurally connect an axle casing for a vehicle wheel axle to a respective of a left and right vehicle frame member, comprising two connection members adapted to be connected to the arms, and two load transfer members adapted to be connected to the axle casing, each of the connection members being adapted to be connected to a respective of the load transfer members by a fastening arrangement cooperating with a fastening formation presented by the respective load transfer member, and each of the load transfer members presenting a first contact surface adapted to abut a complementary first contact surface on the respective connection member, wherein each first contact surface on the respective load transfer member is displaced from the respective fastening formation.

Preferably, the connection members are adapted to be connected to the arms so that, in the mounted condition of the V-stay, the connection members are distributed in parallel with the wheel axle. The load transfer members may be provided as bosses. It should be noted that the load transfer members may be adapted to be connected to the axle casing as parts of a mounting bracket or as integrated with the axle casing.

As stated above, the displacement of the first contact surfaces from the fastening formations, and thereby from the fastening arrangements, provides for reduced loads in the fastening arrangements, so that the risk of damage or failure is significantly reduced. By said displacement, an 80% higher strength in the mounting assembly can be provided compared to known solutions. The mounting assembly can be provided such that forces in the V-stay are transferred via the contact areas, while the fastening arrangements are provided merely to hold the mounting assembly together. Thereby, the need for frequent maintenance of the mounting structure of the V-stay is reduced. Also, the risk of unplanned stops of the vehicle due to V-stay joint failure is reduced. Further, it is possible to reduce the weight of the mounting assembly, e.g. 10% of the weight of a bracket presenting the load transfer members.

The mounting assembly may comprise a bushing, a bushing cover enclosing the bushing and adapted to be connected to the arms, and a bush pin extending through the bushing and presents the connection members protruding on either side of the bushing, wherein each first contact surface on the respective load transfer member is entirely located between the bushing and the respective fastening formation. As is known per se, the bushing may be provided in an elastic material, such as rubber. The bushing may present an outer cylindrical surface between two end surfaces, and a transverse symmetry plane half-way between the end surfaces. Preferably, as is known per se, the bushing cover is adapted to be fixedly connected to the arms. As is also known per se, the bushing may be adapted to be connected to the arms so that, in the mounted condition of the V-stay, the axis of the bushing is oriented in parallel with the wheel axle.

Preferably, the connection members present respective fastening formations each adapted to cooperate with the respective fastening arrangement, and each first contract surface on the respective connection member is displaced from the respective fastening formation of the respective connection member. Each first contact surface on the respective load transfer member may be entirely located between the fastening formations. The first contact surfaces of the load transfer members may face at least partly towards each other and the first contact surfaces of the connection members face at least partly away from each other. Where the mounting assembly comprises a bushing, the bushing may be adapted to be located between the load transfer members, whereby the first contact surfaces of the load transfer members face at least partly towards the bushing. The first contact surfaces of the load transfer members may face, in the mounted condition of the V-stay, at least partly towards the arms. Where the connection members are adapted to be, in the mounted condition of the V-stay, distributed in parallel with the wheel axle, a normal of each first contact surface of the respective load transfer member may present, in the mounted condition of the V-stay, an angle to the wheel axis of 0-75, preferably 0-30, preferably 1-20, preferably 2-10, preferably 3-7 degrees, for example 5 degrees. Preferably, where the mounting assembly comprises a bushing, a normal of each first contact surface of the respective load transfer member presents, in the mounted condition of the V-stay, an angle to the axis of the bushing of 0-75, preferably 0-30, preferably 1-20, preferably 2-10, preferably 3-7 degrees, for example 5 degrees.

Similarly to what has been explained above, preferred orientations of the first contact surfaces may ensure that a major portion of loads are transferred via the first contact surfaces, and provide a favourable balance of the load carrying capacities transversely to and in parallel with the distribution axis.

Preferably, at least one of the first contact surfaces of the load transfer members is a concave or convex surface and the first connection member contact surface to which the first load transfer member contact surface is adapted to abut has a complementary convex or concave shape. Said first contact surface, thereby rounded, can present the shape of a part of a sphere or a part of a cone, or any other concave or convex shape. Preferably, the load transfer members are distributed along a distribution axis, and the convex or concave secondary contact surface presents end regions which are distributed laterally to the distribution axis, and the end regions being offset, in relation to an intermediate region of the secondary contact surface, in the direction of the distribution axis. As understood from the explanation above, the complementarily convex and concave first contact surfaces can provide a guiding function when assembling the connection members to the load transfer members, and they may also have a load transferring effect.

Preferably, the fastening arrangements comprise elongated threaded fasteners which are arranged to be, in the mounted condition of the V-stay, oriented in an essentially vertical direction. Such a vertical orientation may provide an improved accessibility for the fasteners in an assembly or service situation of the vehicle. For example, where the fasteners are bolts, a tool, e.g. a torque wrench, for tightening or loosening the bolts may have a shaft held by a service person, which is perpendicular to the fastener direction, i.e. horizontal. In particular in trucks, horizontal access is usually easier than vertical access in the area of the V-stay.

Preferably, each of the load transfer members presents a further, second contact surface adapted to abut a complementary further, second contact surface on the respective connection member. Preferably, the first and second boss contact surfaces on each load transfer member are separated with an edge, a corner, or a non-contacting surface. Preferably, the radius of such an edge or corner is less than 20%, preferably less than 10%, more preferably less than 5% of the shortest of the maximum length and the maximum width of any of the first contact surfaces which the edge or corner separate. For example, where the maximum width of the first contact surface is 40 mm, the radius of the corner or edge separating the first and second contact surfaces is 1 mm. This provides for distinct separations of the contact surfaces, which may be beneficial in obtaining said load transfer control.

According to another aspect of the invention, a bush pin is provided for a V-stay presenting two arms adapted to structurally connect an axle casing for a vehicle wheel axle to a respective of a left and right vehicle frame member, comprising a central bush portion and a connection member on each side of the central bush portion, wherein each of the connection members is adapted to be connected to a bracket by a fastening arrangement, and each of the connection members presents a primary contact surface adapted to abut a respective complementary primary contact surface on the bracket, wherein each of the connection members presents a further, secondary contact surface adapted to abut a complementary further, secondary contact surface on the bracket, wherein normals of the primary contact surfaces are non-parallel to normals of the secondary contact surfaces.

Similarly to what has been explained above, this provides for a reduction of the loads in the fastening arrangements. The provision of mutually angled contacts surfaces makes it possible to control the load transfer between the bush pin and the bracket. With the improved load transfer control, the risk of damage in the fastening arrangements is significantly reduced.

Preferably, each of the connection members presents a through hole for receipt of a respective fastener of the fastening arrangement for clamping the connection member to the bracket, which through hole extends through the primary contact surface. As also suggested above, thereby the secondary contact surfaces of the bush pin can be located entirely separated from the fastening arrangement, which means that at least a portion of the loads in the V-stay are transferred through the secondary contact surfaces. Thus, the fastening arrangement can be provided merely to hold the bush pin to the bracket, and an improved load transfer control between the wheel axle and the frame of a vehicle can be obtained.

Preferably, the secondary contact surfaces of the connection member face at least partly away from each other. Each secondary contact surface of the bush pin may be located axially inwards of the respective fastening portion, and may at least partly face axially outwards. A normal of each of the secondary contact surfaces may present an angle to a normal of the respective primary contact surface of 15-90 degrees, preferably 60-90 degrees, preferably 70-89 degrees, preferably 80-88 degrees, preferably 83-87 degrees, for example 85 degrees. Each of the secondary contact surfaces of the bush pin may be inclined so that the secondary contact surfaces form a wedge when inserted between the corresponding contact surfaces of the bracket.

Similarly to what has been explained above, preferred orientations of the secondary contact surfaces may ensure that a major portion of loads are transferred via the secondary contact surfaces, and provide a favourable balance of the load carrying capacities transversely to and in parallel with the bush pin. Also preferred locations and orientations of the secondary contact surfaces make it possible to mount the bush pin so as to be firmly wedged between the bracket contact surfaces.

Preferably, the primary and secondary contact surfaces on each connection member are separated with an edge, a corner, or a non-contacting surface. As stated, this provides for distinct separations of the contact surfaces, which may be beneficial in obtaining said load transfer control.

Preferably, each of the connection members presents a through hole for receipt of a respective fastener of the fastening arrangement for clamping the connection member to the bracket, and the secondary contact surfaces each present a maximum length and a maximum width, each of which are at least one eighth, preferably one sixth, more preferably one fourth, of, or at least equal to, a diameter of the through hole. Such minimum dimensions of the secondary contact surfaces will ensure that they provide the advantageous load transfer capacities described above. Preferably, the primary contact surfaces each present a maximum length and a maximum width, each of which are at least 1.3, preferably 1.5, more preferably 2.0, of a diameter of the through hole.

Preferably, at least one of the secondary contact surfaces is a concave or convex surface. Preferably, the convex or concave secondary contact surface presents end regions which are distributed laterally to the axial direction of the bush pin, and the end regions being offset, in relation to an intermediate region of the secondary contact surface, in the axial direction of the bush pin. The advantages of such a concave/convex surface arrangement have been discussed above.

According to another aspect of the invention, a bracket is provided for a V-stay presenting two arms adapted to structurally connect an axle casing for a vehicle wheel axle to a respective of a left and right vehicle frame member, comprising two load transfer members distributed along a distribution axis and connected by a base portion, wherein each of the load transfer members is adapted to be connected to a bush pin by a fastening arrangement, and each of the load transfer members presents a primary contact surface adapted to abut a respective complementary primary contact surface on the bush pin, wherein each of the load transfer members presents a further, secondary contact surface adapted to abut a respective complementary further, secondary contact surface on the bush pin, wherein normals of the primary contact surfaces are non-parallel to normals of the secondary contact surfaces.

As explained above, the provision of mutually angled contacts surfaces makes it possible to control the load transfer between the bush pin and the bracket, and the risk of damage in the fastening arrangements is significantly reduced.

Preferably, each of the load transfer members presents a hole for receipt of a respective fastener of the fastening arrangement for clamping the load transfer member to the bush pin, which hole extends through the primary contact surface. The secondary contact surfaces of the load transfer member may face at least partly towards each other. Each of the secondary contact surfaces may extend in a plane which presents an angle to the respective primary contact surface of 15-90 degrees, preferably 60-90 degrees, preferably 70-89 degrees, preferably 80-88 degrees, preferably 83-87 degrees, for example 85 degrees.

As explained above, preferred orientations of the secondary contact surfaces may ensure that a major portion of loads are transferred via the secondary contact surfaces, and provide a favourable balance of the load carrying capacities transversely to and in parallel with the distribution axis.

Preferably, the primary and secondary contact surfaces on each load transfer member are separated with an edge, a corner, or a non-contacting surface. As stated, this provides for distinct separations of the contact surfaces, which may be beneficial in obtaining said load transfer control.

Preferably, each of the load transfer members presents a hole for receipt of a respective fastener of the fastening arrangement for clamping the load transfer member to the bush pin, the secondary contact surfaces each present a maximum length and a maximum width, each of which are at least one eighth, preferably one sixth, more preferably one fourth, of a diameter of the hole. As stated, such minimum dimensions of the secondary contact surfaces will ensure that they provide the advantageous load transfer capacities described above.

Preferably, at least one of the secondary contact surfaces is a concave or convex surface. Preferably, the convex or concave secondary contact surface presents end regions which are distributed laterally to the distribution axis, and the end regions being offset, in relation to an intermediate region of the secondary contact surface, in the direction of the distribution axis. The advantage of such a concave/convex surface arrangement has been discussed above.

According to another aspect of the invention, a mounting assembly is provided for a V-stay presenting two arms adapted to structurally connect an axle casing for a vehicle wheel axle to a respective of a left and right vehicle frame member, comprising two connection members adapted to be connected to the arms, and two load transfer members adapted to be connected to the axle casing, each of the connection members being adapted to be connected to a respective of the load transfer members by a fastening arrangement including an elongated threaded fastener, and each of the load transfer members presenting a primary contact surface adapted to abut a complementary primary contact surface on the respective connection member, wherein each of the load transfer members presents a further, secondary contact surface adapted to abut a complementary further, secondary contact surface on the respective connection member, wherein normals of the primary contact surfaces are non-parallel to normals of the secondary contact surfaces.

As understood from the explanation above, the provision of mutually angled contacts surfaces makes it possible to control the load transfer between the load transfer members and the connection members, and the risk of damage in the fastening arrangements is significantly reduced.

Preferably, the primary and secondary contact surfaces on each load transfer member are separated with an edge, a corner, or a non-contacting surface. As stated, provides for distinct separations of the contact surfaces, which may be beneficial in obtaining said load transfer control.

Preferably, the secondary contact surfaces of the load transfer members face at least partly towards each other and the secondary contact surfaces of the connection members face at least partly away from each other. The secondary load transfer member contact surfaces may face, in the mounted condition of the V-stay, at least partly towards the arms. Where the connection members are adapted to be, in the mounted condition of the V-stay, distributed in parallel with the wheel axle, and a normal of each secondary load transfer member contact surface may present, in the mounted condition of the V-stay, an angle to the wheel axis of 0-75, preferably 0-30, preferably 1-20, preferably 2-10, preferably 3-7 degrees, for example 5 degrees.

As explained above, preferred orientations of the secondary contact surfaces may ensure that a major portion of loads are transferred via the secondary contact surfaces, and provide a favourable balance of the load carrying capacities transversely to and in parallel with a distribution direction of the load transfer members.

Preferably, at least one of the secondary load transfer member contact surfaces is a concave or convex surface and the secondary connection member contact surface to which the secondary load transfer member contact surface is adapted to abut has a complementary convex or concave shape. Preferably, the load transfer members are distributed along a distribution axis, and the convex or concave secondary contact surface presents end regions which are distributed laterally to the distribution axis, and the end regions being offset, in relation to an intermediate region of the secondary contact surface, in the direction of the distribution axis. The advantage of such a concave/convex contact surface arrangement has been explained above.

Preferably, the secondary load transfer member contact surfaces each present a maximum length and a maximum width, each of which are at least one eighth, preferably one sixth, more preferably one fourth, of a diameter of a portion of the respective fastener extending through the respective load transfer member. As mentioned, such minimum dimensions of the secondary contact surfaces will ensure that they provide the advantageous load transfer capacities described above.

Preferably, the fasteners are arranged to be, in the mounted condition of the V-stay, oriented in an essentially vertical direction. As stated above, such a vertical orientation may provide an improved accessibility for the fasteners in an assembly or service situation of the vehicle.

DESCRIPTION OF THE DRAWINGS

Below embodiments of the invention will be described with reference to the drawings, in which.

DETAILED DESCRIPTION

Figure 1:
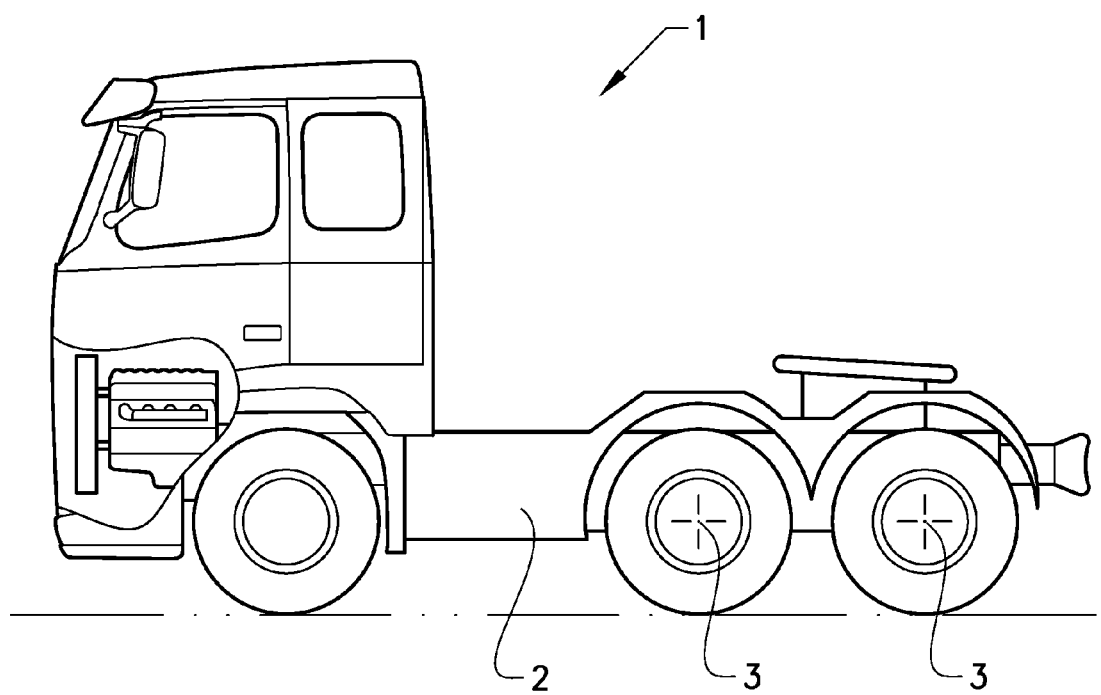
FIG. 1 shows a side view of a vehicle.

FIG. 1 shows a vehicle in the form of a truck 1 for pulling a semi-trailer. The vehicle 1 has frame 2 and two rear wheel axles 3.

Figure 2:
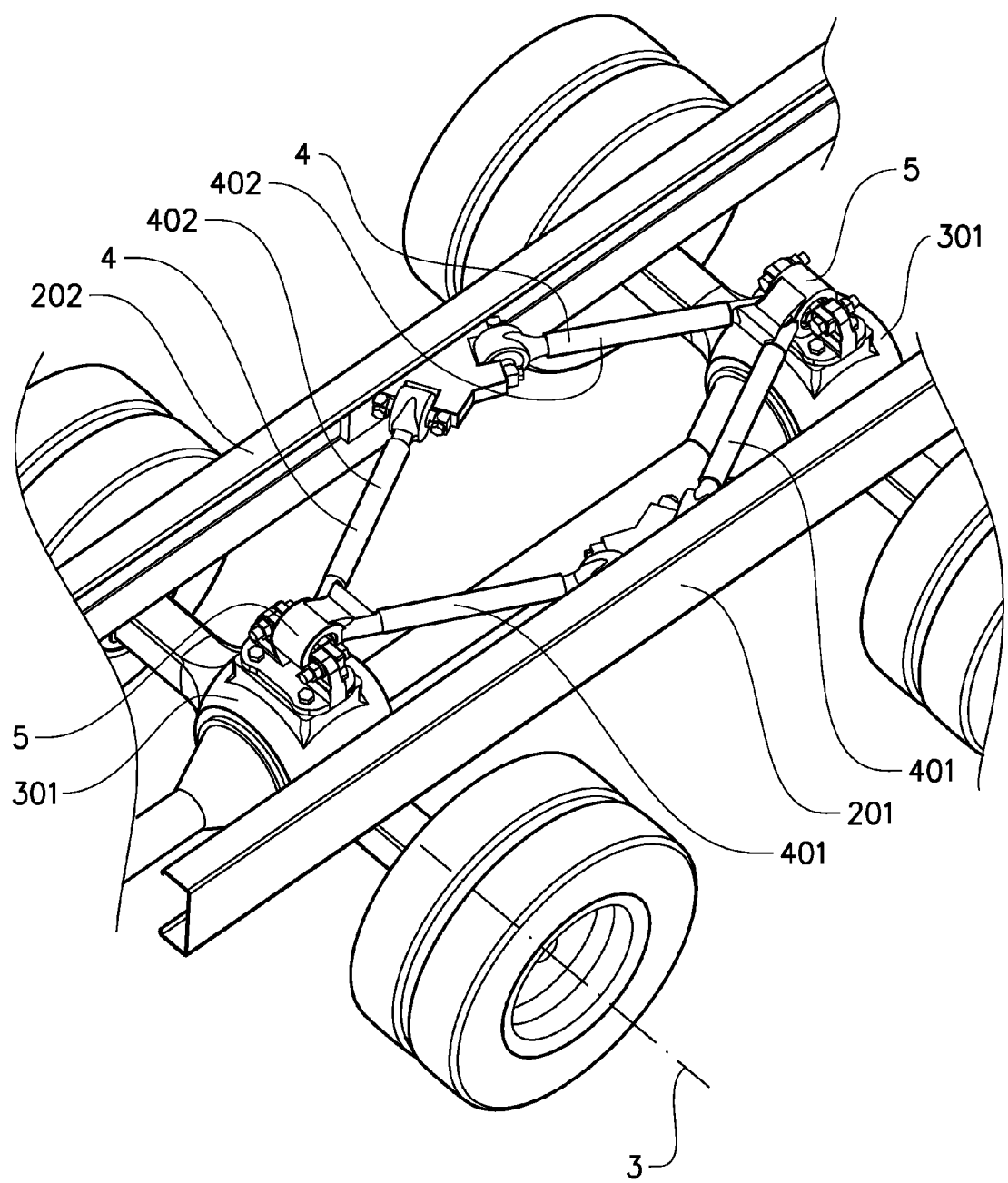
FIG. 2 shows a perspective view of parts of a frame and rear axles of the vehicle in FIG. 1, as well as V-stays connecting the axles to the frame.

In FIG. 2 it can be seen that the frame 2 comprises a left and right vehicle frame member 201, 202. For each rear wheel axle 3 there is a V-stay 4, each presenting two arms 401, 402 structurally connecting an axle casing 301 of the respective wheel axle to the frame members 201, 202. Thereby, the arms extend partially longitudinally and partially laterally in the vehicle, from a mounting assembly 5 on the axle casing 301 to a respective of the left and right frame members 201, 202. The arms 401, 402 thereby form angles such as to present, as viewed from above, the "V" of the V-stay 4, which transfers loads between the respective wheel axle 3 and the frame 2.

Reference is made also to FIG. 3a, FIG. 3b, FIG. 4 and FIG. 5. The mounting assembly 5 connects the arms 401, 402 to the axle casing 301. The mounting assembly comprises a bushing 501 in an elastic material, a bushing cover 502 enclosing the bushing 501 and connected to the arms 401, 402, and a bush pin 503 extending through the bushing 501. The bush pin 501 and the axis of the bushing 501 are oriented in parallel with the wheel axle 3.

Figure 5:
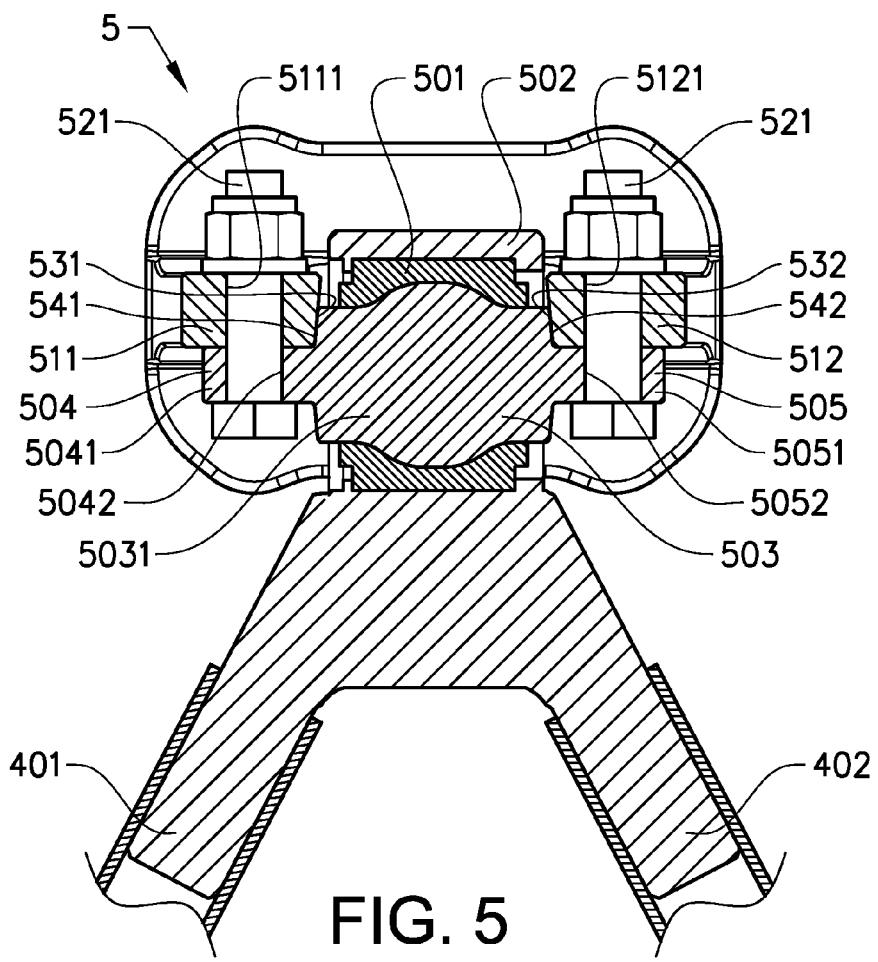

As can be seen in FIG. 5, the bush pin 503 comprises a central bush portion 5031 located inside the bushing 501, and two connection members 504, 505, one on each side of the central bush portion 5031 protruding from the bushing 501. The bushing 501 presents an outer cylindrical surface between two end surfaces, and a transverse symmetry plane halfway between the end surfaces. The central bush portion 5031 has a thickened shape in the middle housed in a complementary inner cavity of the bushing 501.

Each connection member 504, 505 presents an ear-like fastening portion 5041, 5051, provided as a plate-shaped part, adapted to be connected to a bracket 510 by a fastening arrangement. Each connection member 504, 505 also presents a first contact surface 541, 542 which is displaced from the fastening portions 5041, 5051, for contacting a corresponding first contact surface 531, 532 of the bracket 510 in order to transfer loads. Each first contact surface 541, 542 forms a transition of bush pin thickness in a first transverse direction of the bush pin between the central bush portion 5031 and the respective fastening portion 5041, 5051.

Figure 3A:
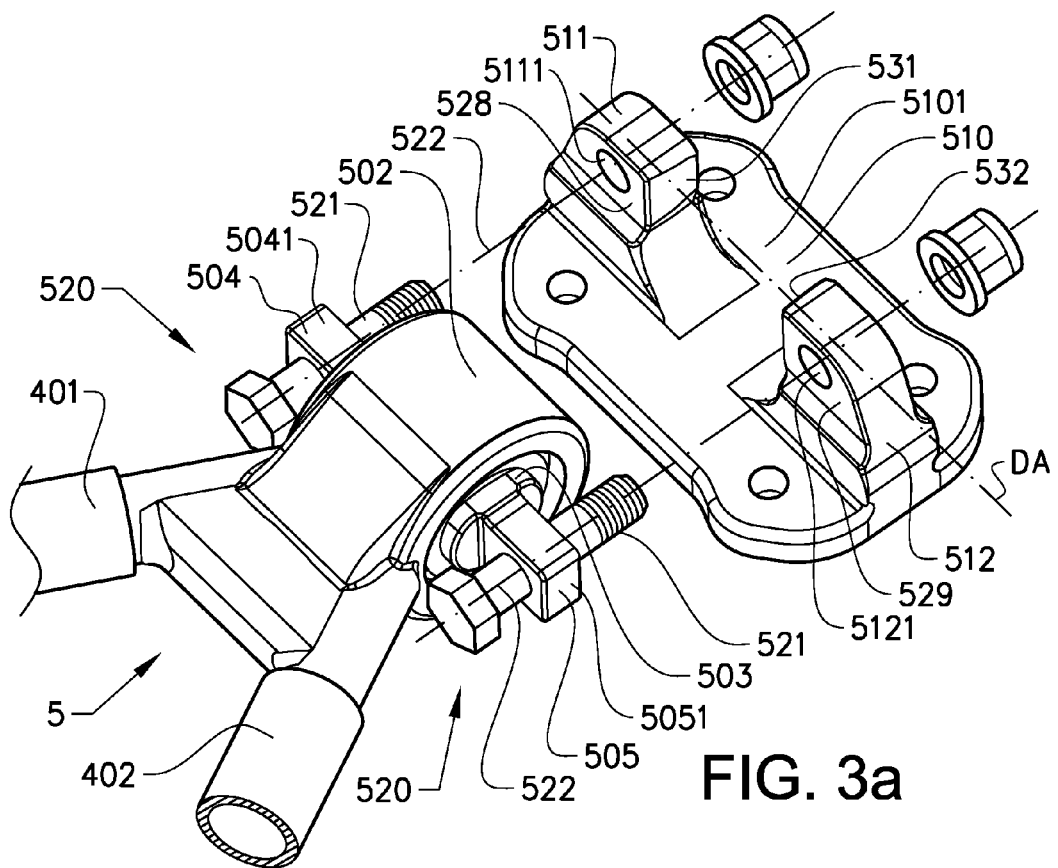
FIG. 3a shows a perspective, exploded view of a mounting assembly connecting arms of one of the V-stays in FIG. 2 to one of the wheel axles therein.
Figure 3B:
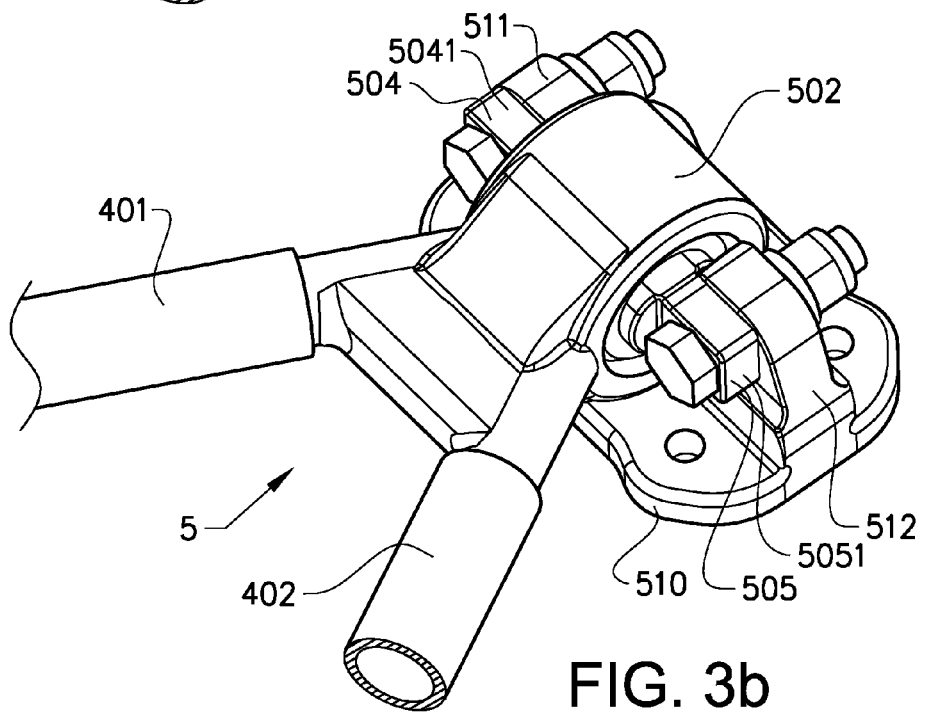
FIG. 3b shows a perspective view of the mounting assembly in FIG. 3a in an assembled state.

As can be seen for example in FIG. 3a, the bracket 510 comprises two boss-like load transfer members 511, 512 distributed along a distribution axis DA, which is parallel to the wheel axis 3. The load transfer members 511, 512 are connected by a base portion 5101. Each load transferring member 511, 512 presents a fastening formation in the form of a threaded hole 5111, 5121, adapted to cooperate with a bolt 521 of a fastening arrangement for connecting the load transferring member 511, 512 to the respective fastening portion 5041, 5051 of the bush pin 503. For this the fastening portions 5041, 5051 present fastening formations in the form of through holes 5042, 5052, indicated in FIG. 5, through with the bolts 521 extend.

The first contact surfaces 531, 532 of the bracket 510 are presented by the load transfer members 511, 512. Each first contact surface 531, 532 is displaced from the respective hole 5111, 5121.

As understood from above, the displacement of the first contact surfaces 531, 532, 541, 542 from the bolts 521 provides for the loads in the V-stay 4 to be transferred through the first contact surfaces 531, 532, 541, 542, while the bolts 521 are provided merely to hold the bracket 510 to the bush pin 503.

Figure 4:
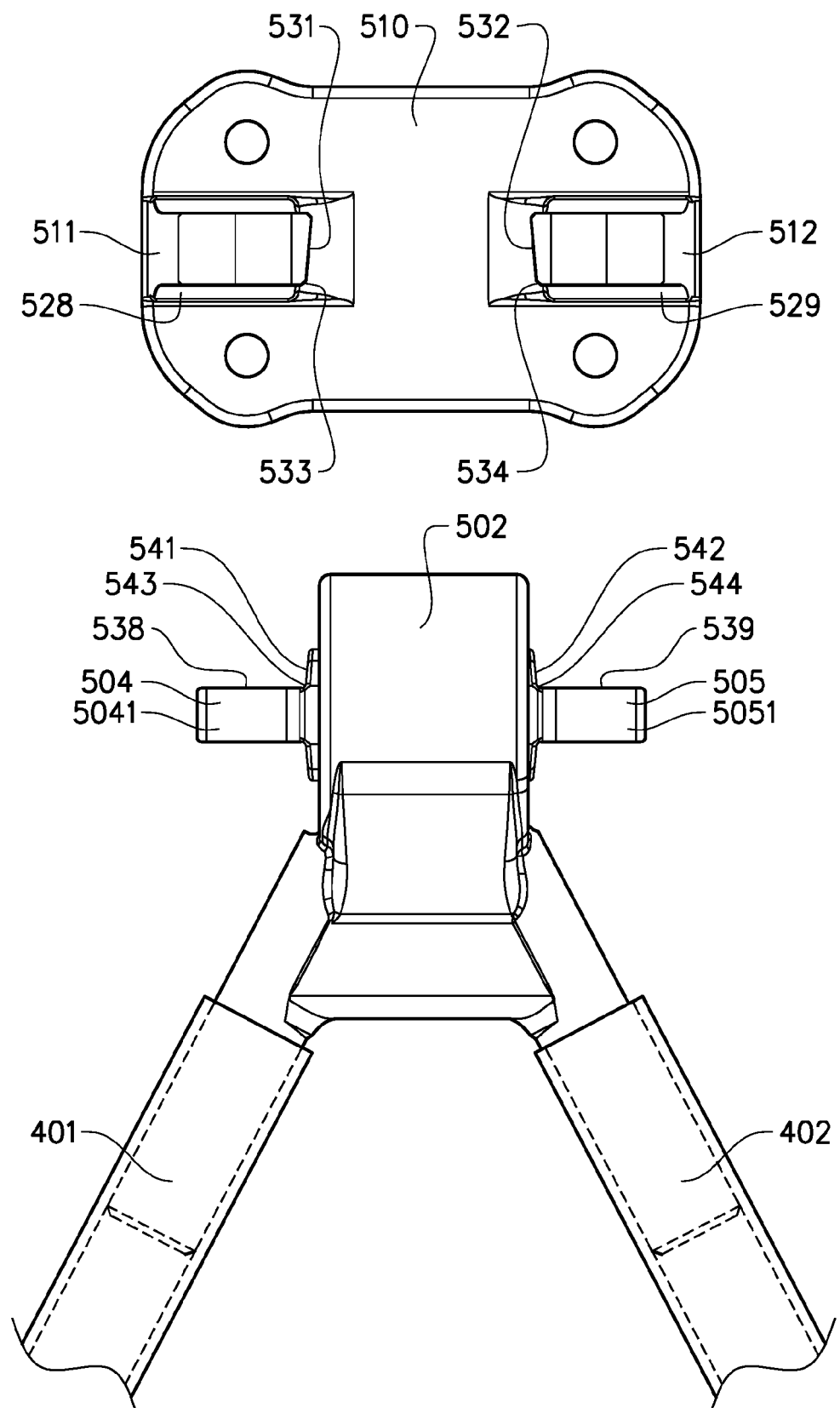
FIG. 4 shows a top view of parts shown in FIG. 3a, FIG. 5 shows a cross-sectional view, the section being oriented such that the longitudinal axes 522 of two bolts 521 shown in FIG. 3a extend within the section.

As can be seen in FIG. 4, each of the load transfer members 511, 512 presents a further, second contact surface 528, 529 adapted to abut a complementary further, second contact surface 538, 539 on the respective connection member 504, 505. Each through hole 5042, 5052 of the bush pin 503 extends through a respective of the second contact surfaces 538, 539 of the bush pin. Each hole 5111, 5121 of the bracket 510 extends through a respective of the second contact surfaces 528, 529 of the bracket 510. The first and second contact surfaces 528, 529, 531, 532 on each load transfer member 511, 512 are separated with an edge 533, 534. Further, the first and second contact surfaces 538, 539, 541, 542 on each connection member 504, 505 are separated with a corner 543, 544. Thus, the first and second contact surfaces are angled to each other, i.e. normals of the first contact surfaces 531, 532, 541, 542 are non-parallel to normals of the second contact surfaces 528, 529, 538, 539.

The first contact surfaces 531, 532, 541, 542 are herein also referred to as secondary contact surfaces, and the second contact surfaces 528, 529, 538, 539 are herein also referred to as primary contact surfaces.

As can be seen in FIG. 5, each first contact surface 531, 532, 541, 542 is entirely located between the bushing 501 and the respective bolt 521. Thus, each first contact surface 531, 532, 541, 542 is entirely located between the bolts 521. The first contact surfaces 531, 532 of the load transfer members 511, 512 face partly towards each other and the first contact surfaces 541, 542 of the connection members 504, 505 face partly away from each other. The word "partly" is here used to indicate an inclination of the face orientation as described in the following paragraph.

Each of the first contact surfaces 541, 542 of the bush pin 503 is inclined so that the first contact surfaces 541, 542 form a wedge when inserted between the corresponding contact surfaces 531, 532 of the bracket 510. For this, the first contact surfaces 531, 532 of the load transfer members 511, 512 face partly towards the arms 401, 402. More specifically, the first contact surfaces 531, 532 of the bracket are inclined so that these first contact surfaces 531, 532 delimit a tapered reception space to receive the bush pin 503 contact surfaces 541, 542. Thereby, it is possible to mount the bush pin 503 so as to be firmly wedged between the bracket contact surfaces 531, 532. This provides for loads to be transferred by friction forces in the contact surfaces. It should be noted that the bolts 521 are directed in parallel with the direction, from the bottom to the top in FIG. 5, of wedge dependent decrease of the distance between the first contact surfaces 541, 542 of the bush pin 503.

The bolts 521 are oriented horizontally, and in parallel with the longitudinal direction of the vehicle, i.e. transversely to the wheel axle 3. A normal of each first contact surface 531, 532, 541, 542 presents an angle to the wheel axis 3 of 5 degrees. Further, a normal of each first contact surface 531, 532, 541, 542 presents an angle to the longitudinal extension of the bolts 521 of 85 degrees.

Figure 6:
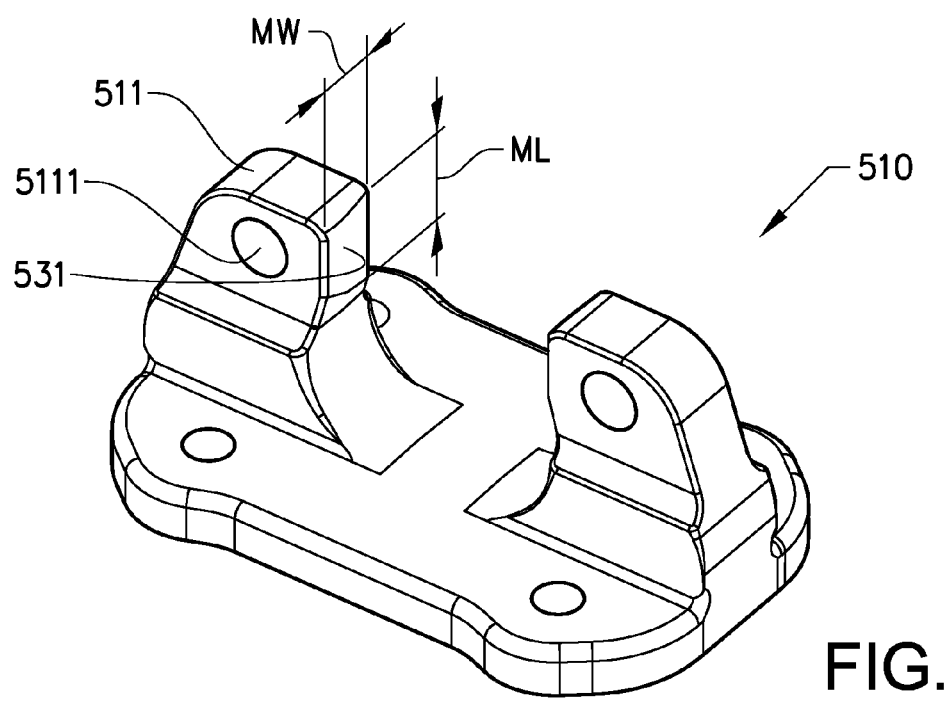
FIG. 6 shows a perspective view of a part of the mounting assembly in FIG. 3a, FIG. 7a shows a perspective, exploded view from above of a mounting assembly according to an alternative embodiment of the invention.
Figure 7A:
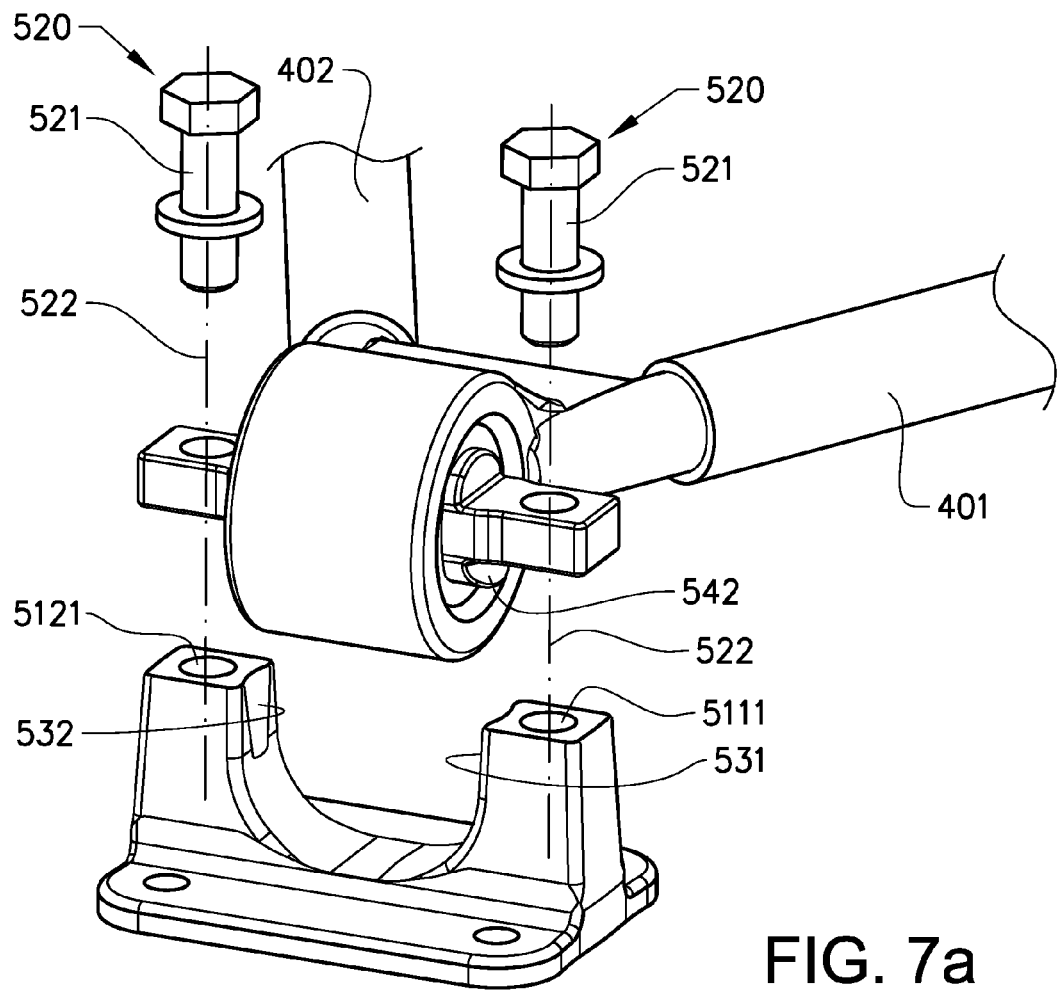
FIG. 7b shows a perspective view of the mounting assembly in FIG. 3a in an assembled state.
Figure 7B:
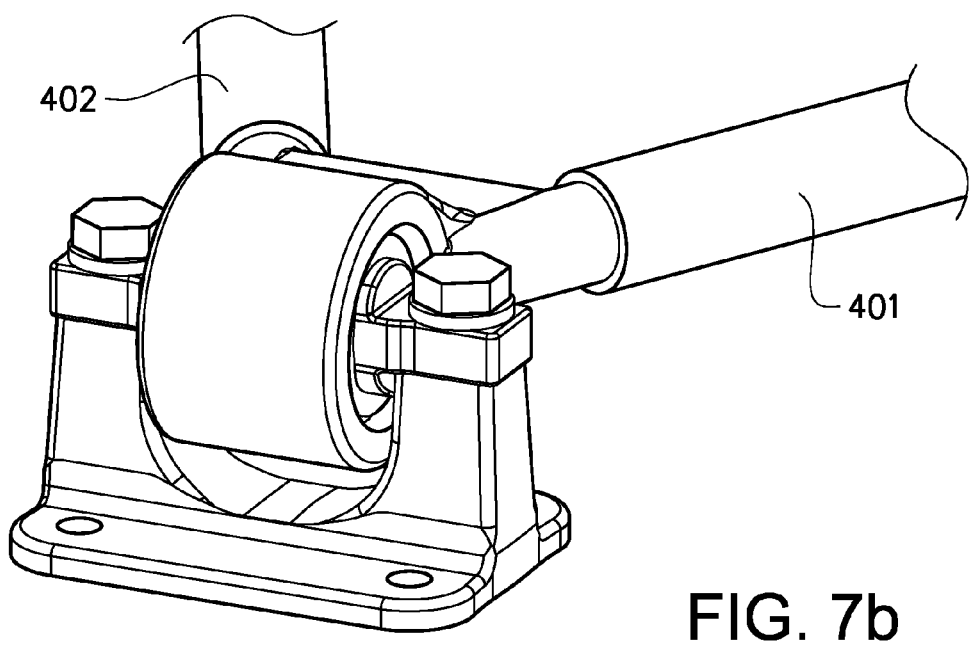
Figure 8:
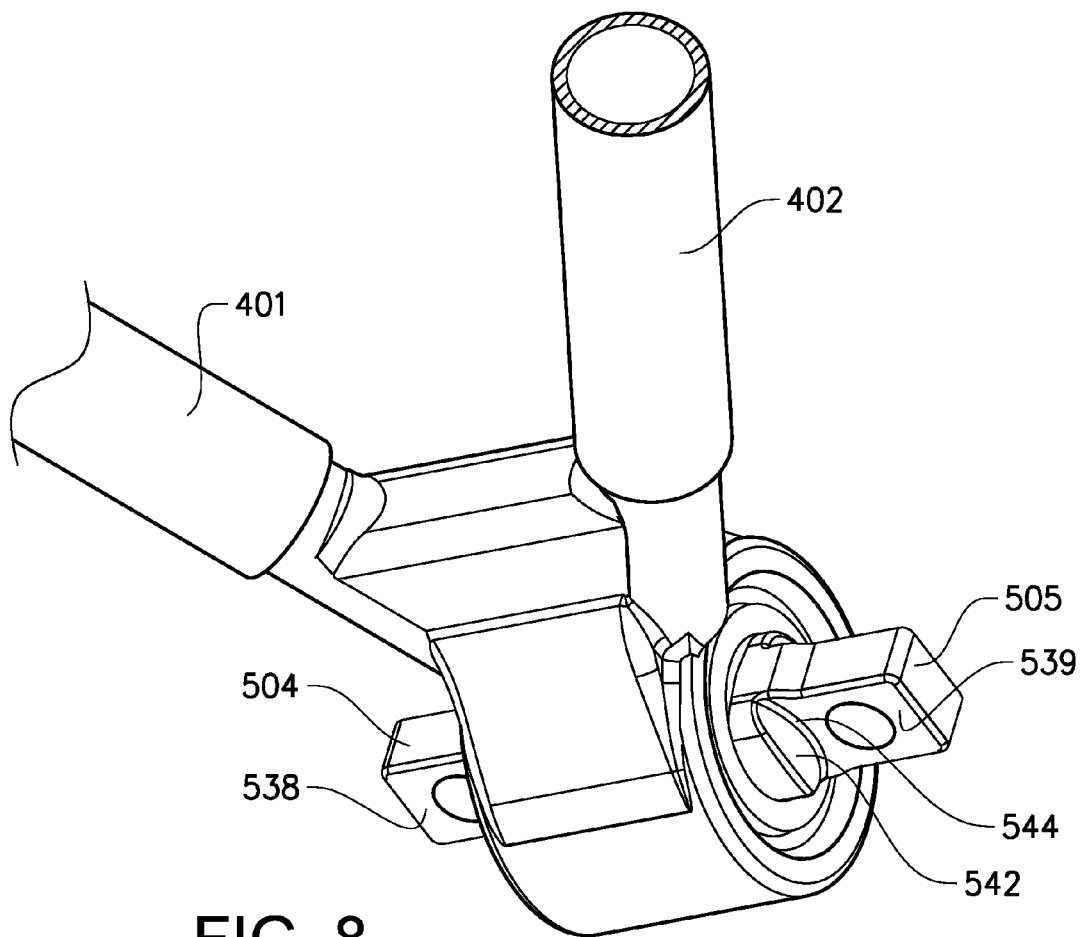
FIG. 8 shows a perspective view from below of a part of the mounting assembly in FIG. 7a, FIG. 9 shows a perspective view from above of another part of the mounting assembly in FIG. 7a, FIG. 10 shows a cross-sectional view, the section being oriented such that the longitudinal axes 522 of two bolts 521 shown in FIG. 7a extend within the section.
Figure 9:
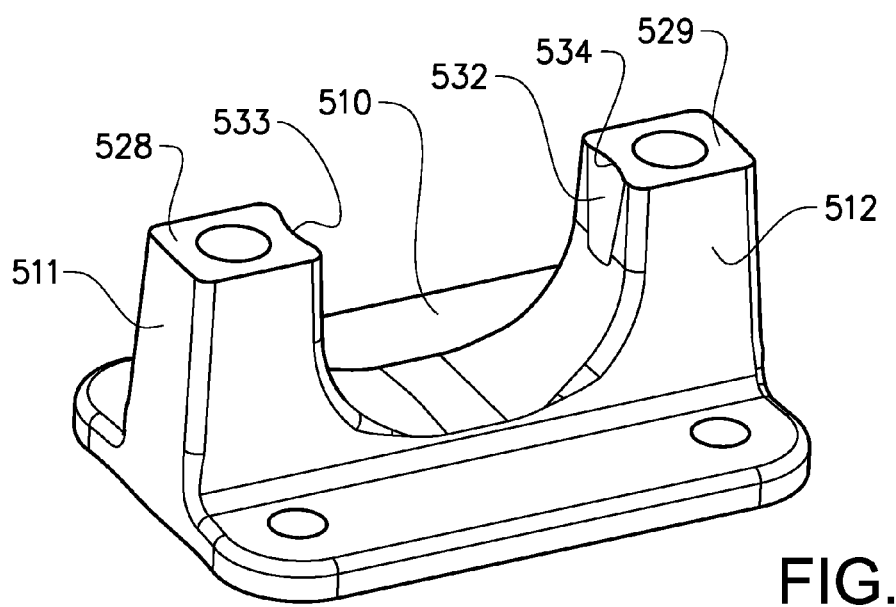

As understood from FIG. 6, the area of the first contact surface 531 of each load transfer member 511 of the bracket 510 is of the same order of magnitude as the cross-sectional area of the hole 5111. More specifically, each of the first contact surfaces have a quadrangular shape and presents a length ML which approximately equals the diameter of the hole 5111, and a width MW which approximately equals half the diameter of the hole 5111. More generally, the shape of the first contact surfaces 531 may vary from embodiment to another, but preferably they all present a maximum length ML and a maximum width MW, each of which are at least one eighth, preferably one sixth, more preferably one fourth, of the diameter of the hole 5111.

Each of the first contact surfaces 541, 542 of the bush pin 503 has an extension transversely to the respective through hole 5042, 5052 which is greater than the extension of the respective fastening portion 5041, 5051 transversely to the respective through hole 5042, 5052.

As stated above with reference to FIG. 4, the first and second contact surfaces 528, 529, 531, 532 on each load transfer member 511, 512 are separated with an edge 533, 53, and the first and second contact surfaces 538, 539, 541, 542 on each connection member 504, 505 are separated with a corner 543, 544. Preferably, the radius of such an edge or corner is less than 20%, preferably less than 10%, more preferably less than 5% of the shortest of the maximum length ML and the maximum width MW of any of the first contact surfaces which the edge or corner separate.

Reference is made to FIG. 7a-FIG. 12, showing an alternative embodiment of the invention. In the embodiment described above with reference to FIG. 3a-FIG. 6, the bolts 521 are oriented horizontally, and transversely to the wheel axle 3. In the embodiment in FIG. 7a-FIG. 12, the bolts 521 are oriented vertically.

Also, while in the embodiment described above with reference to FIG. 3a-FIG. 6, the first contact surfaces are planar, in the embodiment in FIG. 7a-FIG. 12, each of the first contact surfaces 531, 532, 541, 542 of the bush pin has a rounded, part-spherical shape. Each first contact surface 531, 532 of the load transfer members 511, 512 is concave, and the first bush pin contact surface 541, 542 to which the respective first load transfer member contact surface 531, 532 is adapted to abut has a complementary convex shape.

Figure 12:
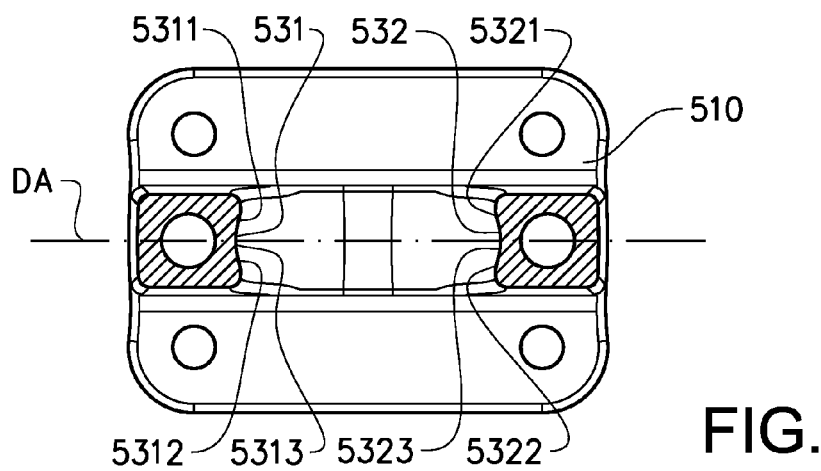
FIG. 12 shows a top view of the part shown in FIG. 9.

Reference is made to FIG. 12. As in the embodiment in FIG. 3a-FIG. 6, the load transfer members 511, 512 are distributed along a distribution axis DA which is parallel to the wheel axle 3 of the vehicle, (FIG. 2). Each first contact surface 531, 532 presents end regions 5211, 5312, 5321, 5322 which are distributed laterally to the distribution axis DA. The end regions are concave such that they are offset, in relation to an intermediate region 5313, 5323 of the respective first contact surface 531, 532, in the direction of the distribution axis DA.

On the bracket 510, the radius of each concavity of may be 0.5-2.5 times the distance between the end regions 5211, 5312, 5321, 5322 of the respective first contact surface 531, 532. For example, where said distance is 40 mm, said concavity radius can be 70 mm. The centre of said concavity radius might be at the centre of the bracket 510. Alternatively, it might be offset towards either of the load transfer members 511, 512, e.g. up to 0.8 times the distance between the end regions 5211, 5312, 5321, 5322 of the respective first contact surface 531, 532. In any of these alternatives, preferably, the first contact surfaces 541, 542 of the bush pin 503 are complementary so that each of them abuts the respective load transfer member first contact surface 531, 532 throughout its respective extension.

As explained above, the complementarily convex and concave first contact surfaces provide a guiding function when assembling the connection members to the load transfer members, and also a load transfer function in the longitudinal direction of the vehicle.

Figure 10:
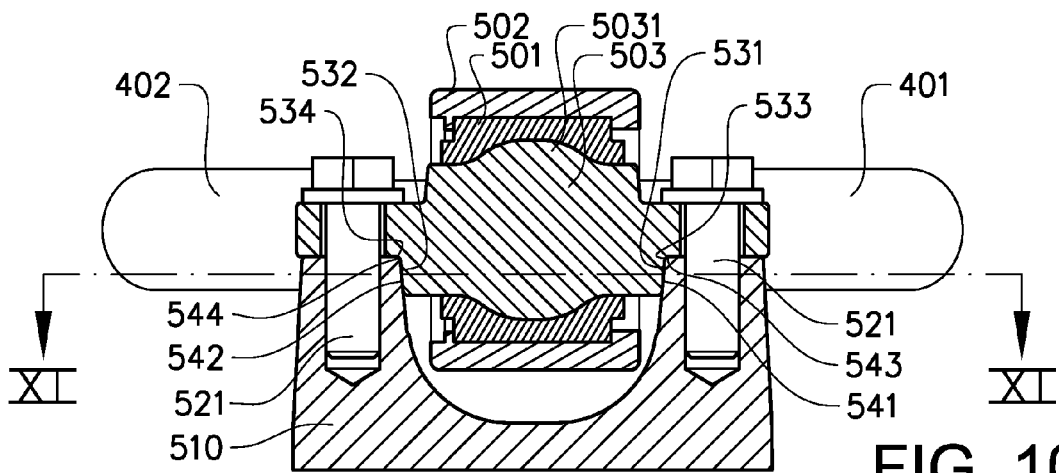

As can be seen in FIG. 10, similarly to the embodiment in FIG. 3a-FIG. 6, each of the first contact surfaces 541, 542 of the bush pin 503 is inclined so that the first contact surfaces 541, 542 form a wedge when inserted between the corresponding contact surfaces 531, 532 of the bracket 510. For this, the first contact surfaces 531, 532 of the load transfer members 511, 512 face partly upwards 401, 402. More specifically, the first contact surfaces 531, 532 of the bracket 510 are inclined so that these first contact surfaces 531, 532 delimit a tapered reception space to receive the bush pin 503 contact surfaces 541, 542. Thereby, it is possible to mount the bush pin 503 so as to be firmly wedged between the bracket contact surfaces 531, 532. As explained above, this provides for an effective load transfer in the contact surfaces.

Figure 11:
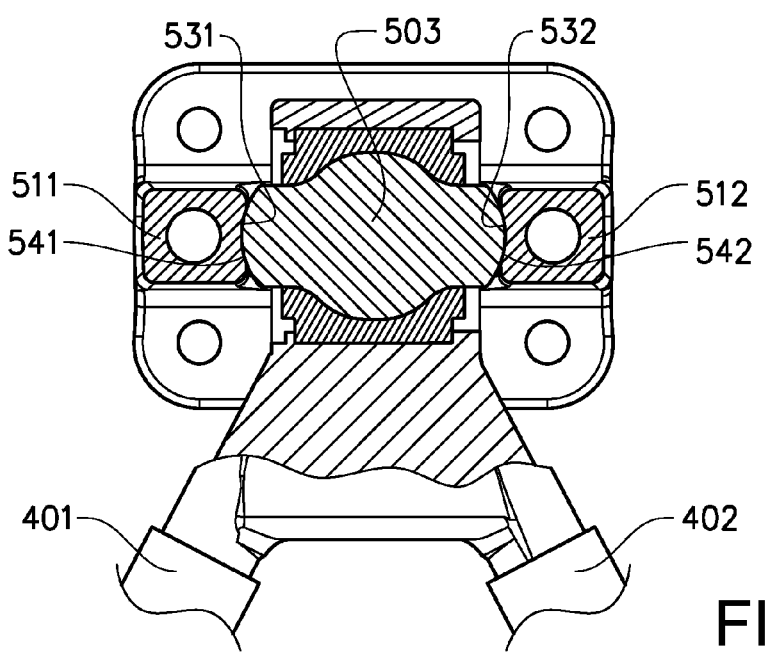
FIG. 11 shows a cross-sectional view, the section being oriented as indicated with the arrows XI-XI in FIG. 10.
Figure 13:
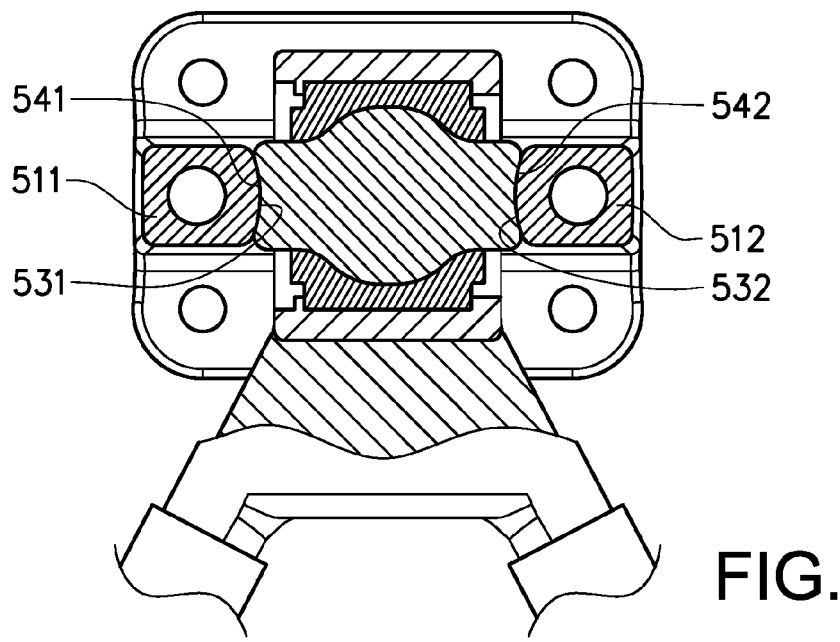
FIG. 13 shows a cross-section, oriented similarly to the cross-section in FIG. 1, of parts of a mounting assembly according to another embodiment of the invention.

FIG. 13 shows that as an alternative to the arrangement in FIG. 11, each first contact surface 531, 532 of the load transfer members 511, 512 can be convex, and the first bush pin contact surface 541, 542 to which the respective first load transfer member contact surface 531, 532 is adapted to abut may have a complementary concave shape.

Figure 14:
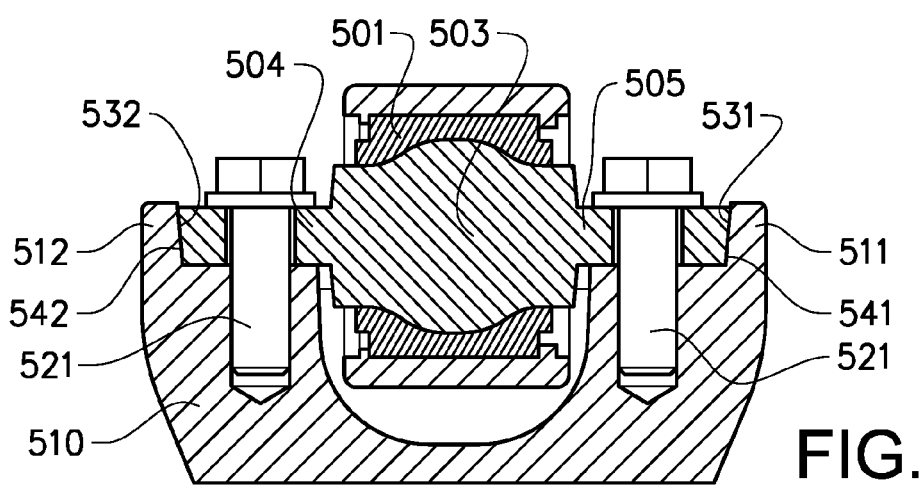
FIG. 14 and FIG. 15 show cross-sections, oriented similarly to the cross-section in FIG. 10, of parts of mounting assemblies according to further alternatives of the invention.
Figure 15:
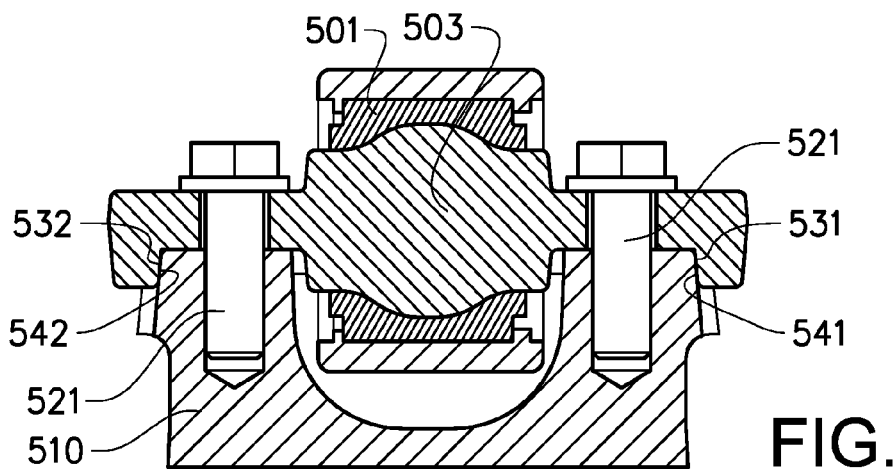

In the embodiments in FIG. 3a-FIG. 13, each first contact surface 531, 532, 541, 542 is entirely located between the bushing 501 and the respective bolt 521. Alternatively, as shown in FIG. 14 and FIG. 15, each first contact surface 531, 532, 541, 542 may be entirely located on the opposite side of the respective bolt 521 in relation to the bushing 501. I.e. each first contact surface 531, 532, 541, 542 may be entirely located externally of the bolts 521.

In FIG. 14 the first contact surfaces 531, 532 of the bracket 510 face partly towards each other and the first contact surfaces 541, 542 of the bush pin 503 face partly away from each other. In FIG. 15 the first contact surfaces 531, 532 of the bracket 510 face partly away from each other and the first contact surfaces 541, 542 of the bush pin 503 face partly towards each other.

The invention claimed is:

1. A bush pin for a V-stay presenting two arms adapted to structurally connect an axle casing for a vehicle wheel axle to a respective of a left and right vehicle frame member, comprising:
    a central bush portion and a fastening portion on each side of the central bush portion, wherein each of the fastening portions is adapted to be connected to a bracket by a fastening arrangement,
    wherein the bush pin comprises a first contact surface on each side of the central bush portion, and displaced from the fastening portions, for contacting a corresponding contact surface of the bracket in order to transfer loads, each first contact surface being arranged entirely between the central bush portion and a respective fastening arrangement,
    wherein each of the first bush pin contact surfaces presents a normal which is non-perpendicular to an axial direction of the bush pin, wherein each of the first contact surfaces of the bush pin is inclined so that the first contact surfaces form a wedge when inserted between the corresponding contact surfaces of the bracket.

2. The bush pin according to claim 1, wherein each first contact surface of the bush pin is located axially inwards of the respective fastening portion, and at least partly faces axially outwards.

3. The bush pin according to claim 1, wherein each of the fastening portions presents a through hole for receipt of a respective fastener of the fastening arrangement for clamping the fastening portion to the bracket, and wherein a normal of the first contact surface presents an angle to an extension direction of the respective through hole of 15-90 degrees.

4. The bush pin according to claim 1, wherein each of the fastening portions presents a second contact surface for being clamped to the bracket by the fastening arrangement, and wherein each of the first contact surfaces extends in a plane which presents an angle to the respective second contact surface of 15-90 degrees.

5. The bush pin according to claim 3, wherein each of the fastening portions presents a second contact surface for being clamped to the bracket by the fastening arrangement, and wherein each of the first contact surfaces extends in a plane which presents an angle to the respective second contact surface of 15-90 degrees, and wherein the through hole extends through the second contact surface.

6. The bush pin according to claim 1, wherein each first contact surface of the bush pin forms a transition of bush pin thickness in a first transverse direction of the bush pin between the central bush portion and the respective fastening portion.

7. The bush pin according to claim 1, wherein each of the fastening portions is formed by a plate-shaped part.

8. The bush pin according to claim 1, wherein each of the first contact surfaces of the bush pin has a rounded shape.

9. A mounting assembly for a V-stay presenting two arms adapted to structurally connect an axle casing for a vehicle wheel axle to a respective of a left and right vehicle frame member, comprising:
two connection members adapted to be connected to the arms, and
two load transfer members adapted to be connected to the axle casing,
each of the connection members being adapted to be connected to a respective load transfer member of the load transfer members by a fastening arrangement cooperating with a fastening formation presented by the respective load transfer member, and
each of the load transfer members presenting a first contact surface adapted to abut a complementary first contact surface on the respective connection member,
wherein each first contact surface on the respective load transfer member is displaced from the respective fastening formation,
the mounting assembly comprising a bushing, a bushing cover enclosing the bushing and adapted to be connected to the arms, and a bush pin extending through the bushing and presenting the connection members protruding on either side of the bushing, wherein each first contact surface on the respective load transfer member is entirely located between the bushing and the respective fastening formation, wherein the first contact surfaces of the load transfer members face at least partly towards each other and the first contact surfaces of the connection members face at least partly away from each other,
wherein each of the first contact surfaces on the connection members is inclined so that the first contact surfaces on the connection members form a wedge when inserted between the contact surfaces of the load transfer members.

10. The mounting assembly according to claim 9, wherein each first contact surface on the respective load transfer member is entirely located between the bushing and the respective fastening formation.

11. The mounting assembly according to claim 9, wherein the connection members present respective fastening formations each adapted to cooperate with the respective fastening arrangement, and each first contact surface on the respective connection member is displaced from the respective fastening formation of the respective connection member.

12. The mounting assembly according to claim 9, wherein each first contact surface on the respective load transfer member is entirely located between the fastening formations.

13. The mounting assembly according to claim 9, wherein the first contact surfaces of the load transfer members face, in a mounted condition of the V-stay, at least partly towards the arms.

14. The mounting assembly according to claim 9, wherein at least one of the first contact surfaces of the load transfer members is a concave or convex surface and the first contact surface on the connection member to which the first load transfer member contact surface is adapted to abut has a complementary convex or concave shape.

15. The mounting assembly according to claim 14, wherein the load transfer members are distributed along a distribution axis, and a convex or concave secondary contact surface presents end regions which are distributed laterally to the distribution axis, and the end regions being offset, in relation to an intermediate region of the secondary contact surface, in the direction of the distribution axis.

16. The mounting assembly according to claim 9, wherein the fastening arrangements comprise elongated threaded fasteners which are arranged to be in a mounted condition of the V-stay, oriented in an essentially vertical direction.

17. A bush pin for a V-stay presenting two arms adapted to structurally connect an axle casing for a vehicle wheel axle to a respective of a left and right vehicle frame member, comprising:
a central bush portion and a connection member on each side of the central bush portion,
wherein each connection member presents an ear-like fastening portion, provided as a plate-shaped part,
wherein each of the connection members is adapted to be connected to a bracket by a fastening arrangement comprising a fastening portion on each side of the central bush portion, and each of the connection members presents a primary contact surface adapted to abut a respective complementary primary contact surface on the bracket,
wherein each of the connection members presents a through hole for receipt of a respective fastener of the fastening arrangement for clamping the connection member to the bracket, the through hole extending through the primary contact surface,
wherein each of the connection members presents a further, secondary contact surface displaced from the fastening portions and adapted to abut a complementary further, secondary contact surface on the bracket,
wherein normals of the primary contact surfaces are non-parallel to normals of the secondary contact surfaces, wherein each secondary contact surface on the respective connection member forms a transition of bush pin thickness in a first transverse direction of the bush pin between the central bush portion and the respective fastening portion, the normal of the secondary contact surfaces having a component from a center of the central bush pin and in a direction of the first transverse direction, wherein a distance between the normal of the respective secondary contact surfaces is smaller than a distance in the first transverse direction between the respective through holes.

18. The bush pin according to claim 17, wherein the secondary contact surfaces of the connection member face at least partly away from each other.

19. The bush pin according to claim 17, wherein a normal of each of the secondary contact surfaces presents an angle to a normal of the respective primary contact surface of 15-90 degrees.

20. The bush pin according to claim 17, wherein the secondary contact surfaces each present a maximum length (ML) and a maximum width (MW), each of which are at least one eighth of a diameter of the through hole.

21. The bush pin according to claim 17, wherein at least one of the secondary contact surfaces is a concave or convex surface.

22. The bush pin according to claim 21, wherein the convex or concave secondary contact surface presents end regions which are distributed laterally to an axial direction of the bush pin, and the end regions being offset, in relation to an intermediate region of the secondary contact surface, in the axial direction of the bush pin.

23. A mounting assembly for a V-stay presenting two arms adapted to structurally connect an axle casing for a vehicle wheel axle to a respective of a left and right vehicle frame member, comprising:
two connection members adapted to be connected to the arms, and
two load transfer members adapted to be connected to the axle casing,
wherein each connection member presents an ear-like fastening portion, provided as a plate-shaped part, each of the connection members being adapted to be connected to a respective one of the load transfer members by a fastening arrangement including an elongated threaded fastener, and
each of the load transfer members presenting a primary contact surface adapted to abut a complementary primary contact surface on the respective connection member,
wherein each of the load transfer members presents a further, secondary contact surface displaced from the fastening portions and adapted to abut a complementary further, secondary contact surface on the respective connection member,
the mounting assembly comprising a bushing, a bushing cover enclosing the bushing and adapted to be connected to the arms, and a bush pin extending through the bushing and presenting the connection members protruding on either side of the bushing,
wherein each secondary contact surface on the respective load transfer member is entirely located between the bushing and a respective elongated threaded fastener,
the bush pin comprising a central bush portion located inside the bushing,
wherein normals of the primary contact surfaces are non-parallel to normals of the secondary contact surfaces, wherein each secondary contact surface on the respective connection member forms a transition of bush pin thickness in a first transverse direction of the bush pin between the central bush portion and the respective fastening portion.

24. The mounting assembly according to claim 23, wherein the secondary contact surfaces of the load transfer members face at least partly towards each other and the secondary contact surfaces of the connection members face at least partly away from each other.

25. The mounting assembly according to claim 23, wherein the secondary load transfer member contact surfaces face, in a mounted condition of the V-stay, at least partly towards the arms.

26. The mounting assembly according to claim 23, wherein the connection members are adapted to be, in a mounted condition of the V-stay, distributed in parallel with the vehicle wheel axle, and a normal of each secondary load transfer member contact surface presents, in a mounted condition of the V-stay, an angle to the vehicle wheel axle of 0-75 degrees.

27. The mounting assembly according to claim 23, wherein the fasteners are arranged to be, in a mounted condition of the V-stay, oriented in an essentially vertical direction.

28. A vehicle provided with the bush pin according to claim 1.

* * * * *